United States Patent
Turtinen et al.

(10) Patent No.: US 11,997,718 B2
(45) Date of Patent: May 28, 2024

(54) RANDOM ACCESS PROCEDURE

(71) Applicant: NOKIA TECHNOLOGIES OY, Espoo (FI)

(72) Inventors: Samuli Turtinen, Ii (FI); Chunli Wu, Beijing (CN); Benoist Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 505 days.

(21) Appl. No.: 17/276,591

(22) PCT Filed: Sep. 21, 2018

(86) PCT No.: PCT/CN2018/107114
§ 371 (c)(1),
(2) Date: Mar. 16, 2021

(87) PCT Pub. No.: WO2020/056770
PCT Pub. Date: Mar. 26, 2020

(65) Prior Publication Data
US 2022/0046712 A1    Feb. 10, 2022

(51) Int. Cl.
*H04W 74/0833*  (2024.01)
*H04W 72/1268*  (2023.01)
*H04W 72/23*    (2023.01)

(52) U.S. Cl.
CPC ... *H04W 74/0833* (2013.01); *H04W 72/1268* (2013.01); *H04W 72/23* (2023.01)

(58) Field of Classification Search
CPC ......... H04W 74/0833; H04W 72/1268; H04W 72/23; H04W 74/008; H04W 74/002; H04W 28/0278
See application file for complete search history.

(56) References Cited

U.S. PATENT DOCUMENTS

2014/0079011 A1*  3/2014  Wiberg ............... H04W 74/006
                                                      370/329
2015/0282213 A1   10/2015  Sun et al.
(Continued)

FOREIGN PATENT DOCUMENTS

CN   108391314 A    8/2018
CO   2020/0009283 A2  8/2020
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 v15.2.0 (Jul. 6, 2018), 126 pages.
(Continued)

*Primary Examiner* — Fred A Casca
(74) *Attorney, Agent, or Firm* — ALSTON & BIRD LLP (57) ABSTRACT

Embodiments of the present disclosure relate to methods, devices and computer readable mediums for random access procedure. The method comprises transmitting, at a terminal device, a random access request in a random access procedure to a network device; in response to receiving, in the random access procedure, from the network device an uplink grant for the terminal device, determining whether a first size of a first data unit indicated by the uplink grant matches a second size of a second data unit stored in a buffer of the terminal device; in response to determining that the first size mismatches the second size, determining a first part of the second data unit for subsequent transmissions.

19 Claims, 3 Drawing Sheets

(56) References Cited

U.S. PATENT DOCUMENTS

| | | | |
|---|---|---|---|
| 2016/0037528 A1* | 2/2016 | Kim | H04W 72/0453 370/329 |
| 2016/0302235 A1 | 10/2016 | Hwang et al. | |
| 2018/0049068 A1 | 2/2018 | Agiwal et al. | |
| 2018/0063777 A1 | 3/2018 | Müller | |
| 2018/0070386 A1 | 3/2018 | Zhang et al. | |
| 2018/0206290 A1 | 7/2018 | Dai | |
| 2018/0270698 A1 | 9/2018 | Babaei et al. | |
| 2018/0270699 A1 | 9/2018 | Babaei et al. | |
| 2020/0084828 A1* | 3/2020 | Loehr | H04L 1/1822 |
| 2020/0137798 A1 | 4/2020 | Bergquist et al. | |
| 2021/0160858 A1 | 5/2021 | Wu et al. | |
| 2021/0274538 A1 | 9/2021 | Liu et al. | |
| 2022/0201561 A1 | 6/2022 | Bin Redhwan et al. | |

FOREIGN PATENT DOCUMENTS

| | | |
|---|---|---|
| CO | 2021/000467 A2 | 1/2021 |
| CO | 2021/0001203 A2 | 2/2021 |
| EP | 2 152 045 A2 | 2/2010 |
| EP | 2 705 720 B1 | 1/2015 |
| EP | 3 416 447 A1 | 12/2018 |
| EP | 3 834 545 A1 | 6/2021 |
| EP | 3 850 902 A1 | 7/2021 |
| RU | 2634712 C1 | 11/2017 |
| WO | WO 2014/017966 A1 | 1/2014 |
| WO | WO 2015/142239 A1 | 9/2015 |
| WO | WO 2017/051381 A1 | 3/2017 |
| WO | WO 2017/133565 A1 | 8/2017 |
| WO | WO 2018/030711 A1 | 2/2018 |
| WO | WO 2018/127549 A1 | 7/2018 |
| WO | WO 2019/106576 A1 | 6/2019 |
| WO | WO 2019/215707 A1 | 11/2019 |
| WO | WO 2020/030970 A1 | 2/2020 |
| WO | WO 2020/053645 A1 | 3/2020 |

OTHER PUBLICATIONS

"3rd Generation Partnership Project; Technical Specification Group Radio Access Network; NR; Medium Access Control (MAC) protocol specification (Release 15)", 3GPP TS 38.321 v15.2.0 (Jun. 20, 2018), 73 pages.
"3rd Generation Partnership Project; Technical Specification Group Radio Access Network; NR; Physical layer procedures for data (Release 15)", 3GPP 38.214 v15.2.0 (Jun. 29, 2018), 95 pages.
ASUSTeK, "Discussion on Random Access Preamble Selection for Handover", 3GPP TSG-RAN WG2 Meeting #102, R2-1806919, (May 21-25, 2018), 4 pages.
Ericsson, "Corrections on MAC PDU Handling when Receiving a Different Grant Size in RAR", 3GPP TSG-WG2 Meeting #103, R2-1811621, (Aug. 20-24, 2018), 3 pages.
Ericsson, "Corrections on MAC PDU Handling when Receiving a Different Grant Size in RAR", 3GPP TSG-WG2 Meeting #103, R2-1813044, (Aug. 20, 24, 2018), 3 pages.
International Search Report and Written Opinion for Patent Cooperation Treaty Application No. PCT/CN2018/107114 dated May 24, 2019, 7 pages.
LG Electronics Inc., "Handling of the Msg3 Buffer for RA Switching", 3GPP TSG-RAN2 Meeting RAN2#103, R2-1812784, (Aug. 20-24, 2018), 3 pages.
Nokia et al., "Msg3 Handling when Switching from CBRA to CFRA", 3GPP TSG-RAN WG2 Meeting NR Adhoc 1807, R2-1810157, (Jul. 2-6, 2018), 3 pages.
Decision to Grant for Japanese Application No. 2021-515529 dated Mar. 23, 2023, 4 pages.
Office Action for Egyptian Application No. 2021030424 dated Apr. 19, 2023, 7 pages.
Office Action for Singapore Application No. 11202102694Q dated Feb. 7, 2023, 11 pages.
CATT, "Correction on Msg3 MAC PDU", 3GPP TSG-RAN WG2 Meeting #103, Change Request 0309, R2-1811212, (Aug. 20-24, 2018), 3 pages.
Decision to Grant for Russian Application No. 2022115988/07 dated Sep. 9, 2022, 18 pages.
Ericsson, "Report on Email Discussion [101bis#77] RRC-MAC Interaction in EDT", 3GPP TSG-RAN WG2 #102, R2-1807797, (May 21-25, 2018), 17 pages.
Huawei et al., "RACH Procedure in Early Data Transmission", 3GPP TSG RAN WG2 Meeting #100, R2-1713191, (Nov. 27-Dec. 1, 2017), 3 pages.
Lenovo et al., "TB Size Mismatch when Switching Between CFRA and CBRA", 3GPP TSG-RAN WG2 Meeting #103, R2-1812206, (Aug. 20-24, 2018), 2 pages.
LG Electronics, Inc., "CR on Handling of the Msg3 Buffer for RA Switching", 3GPP TSG-RAN2 Meeting RAN2#103, Change Request 0392, R2-1812787, (Aug. 20-24, 2018), 3 pages.
MediaTek Inc., "Early Data Transmission TBS Determination", 3GPP TSG RAN WG2 Meeting #101, R2-1802603, (Feb. 26-Mar. 2, 2018), 6 pages.
Office Action for Chilean Application No. 202100674 dated May 16, 2022, 30 pages.
Office Action for Japanese Application No. 2021-515529 dated Jun. 27, 2022, 12 pages.
Office Action for Korean Application No. 10-2021-7010645 dated Jun. 21, 2022, 13 pages.
Samsung Electronics, "Msg3 Handling for Switching Between CBRA to CFRA", 3GPP TSG-RAN2 103, Change Request 0303, R2-1811107, (Aug. 20-24, 2018), 5 pages.
Decision to Grant for Russian Application No. 2021108646/07 dated Apr. 14, 2022, 13 pages.
Extended European Search Report for European Application No. 18934107.6 dated Apr. 20, 2022, 10 pages.
Notice of Allowance for Taiwanese Application No. 108133644 dated Apr. 25, 2022, 3 pages.
Office Action for Algerian Application No. DZ/P/2021/0187 dated Feb. 22, 2022, 2 pages.
Office Action for Australian Application No. 2018442418 dated Feb. 24, 2022, 6 pages.
Office Action for Canadian Application No. 3,112,352 dated Mar. 2, 2022, 4 pages.
Office Action for Vietnamese Application No. 1-2021-01812 dated Mar. 31, 2022, 2 pages.
ASUSTeK, "Discussion on Issues in Switching From CBRA to CFRA", 3GPP TSG-RAN WG2 Meeting #103, R2-1812844, (Aug. 20-24, 2018), 5 pages.
CATT, "Msg3 MAC PDU Assembly in NR", 3GPP TSG-RAN WG2 #103, R2-1811211, (Aug. 20-24, 2018), 4 pages.
Ericsson, "UE Switch from CBRA to CFRA and Possible Issues", 3GPP TSG-RAN WG2 AH 1807, R2-1810084, (Jul. 2-6, 2018), 2 pages.
VIVO, "Discussion on the Switch Between CFRA and CBRA", 3GPP TSG-RAN WG2 Meeting #103, R2-1811898, (Aug. 20-24, 2018), 5 pages.
Office Action for Indian Application No. 202127013073 dated May 12, 2022, 6 pages.
Office Action for Russian Application No. 2021108646/(018591) dated Sep. 20, 2021, 9 pages.
Office Action for Bangladesh Application No. 219/2019 dated Oct. 12, 2020, 1 page.
Office Action for Bangladesh Application No. 219/2019 dated Feb. 7, 2021, 1 page.
Office Action for Taiwan Application No. 108133644 dated Aug. 4, 2020, 6 pages.
Decision to Grant for ARIPO Application No. AP/P/2021/013004 dated Aug. 1, 2023, 6 pages.
Decision to Grant for Chinese Application No. 201880098014.8 dated Dec. 22, 2023, 3 pages.
Nokia et al., "Msg3 Rebuilding", 3GPP TSG-RAN WG2 Meeting #103bis, R2-1815548, (Oct. 8-12, 2018), 3 pages.
Notice of Acceptance for Australian Application No. 2018442418 dated Nov. 11, 2022, 3 pages.
Notice of Acceptance for South Africa Application No. 2021/02451 dated Sep. 8, 2023, 2 pages.
Notice of Allowance for Canadian Application No. 3,112,352 dated Apr. 13, 2023, 1 page.

(56) References Cited

OTHER PUBLICATIONS

Notice of Allowance for Korean Application No. 10-2021-7010645 dated Jul. 31, 2023, 4 pages.
Office Action for Argentina Application No. 20190102661 dated Apr. 5, 2023, 6 pages.
Office Action for Argentina Application No. 20190102661 dated Oct. 26, 2022, 12 pages.
Office Action for ARIPO Application No. AP/P/2021/013004 dated Nov. 1, 2022, 6 pages.
Office Action for Chilean Application No. 202100674 dated May 2, 2023, 44 pages.
Office Action for Chinese Application No. 201880098014.8 dated Jun. 30, 2023, 18 pages.
Office Action for Egyptian Application No. 424/2021 dated Apr. 19, 2023, 6 pages.
Office Action for Indonesian Application No. P00202102587 dated Sep. 13, 2023, 4 pages.
Office Action for Korean Application No. 10-2021-7010645 dated Feb. 20, 2023, 6 pages.
Office Action for Saudi Arabia Application No. 521421513 dated Mar. 30, 2023, 8 pages.
Office Action for Saudi Arabia Application No. 521421513 dated Sep. 27, 2023, 10 pages.
Office Action for Taiwan Application No. 111127734 dated Dec. 15, 2022, 6 pages.
Office Action for Taiwan Application No. 111127734 dated Jul. 7, 2023, 10 pages.
Office Action for Colombia Application No. NC2021/0004527 dated Dec. 28, 2023, 18 pages.

* cited by examiner

RANDOM ACCESS PROCEDURE

CROSS-REFERENCE TO RELATED APPLICATIONS

This application is a national phase entry of International Application No. PCT/CN2018/107114, filed Sep. 21, 2018, the entire contents of which are incorporated herein by reference.

TECHNICAL FIELD

Embodiments of the present disclosure generally relate to the field of telecommunication, and in particular, to methods, devices and computer readable storage media for random access procedure.

BACKGROUND

The 5G New Radio (NR) is provided with a multi-beam operation. Support for the multi-beam operation in NR includes beam quality measurement, beam quality reporting, beam assignment, and recovery mechanism in case the assigned beam quality is not good enough. NR provides support for multi-beam operation at every stage of the radio operation: initial/random access, paging, data/control transmission/reception, and mobility handling.

In the case of the multi-beam operation in NR, user equipments (UEs) may switch between the beams allocated with Contention Free Random Access (CFRA) resources and the beams allocated with Contention Based Random Access (CBRA) resources. However, in LTE, the communication network allocates CFRA resources in the whole cell for the UEs. In other words, there is no switching between CFRA and CBRA. Thus, when the beam switching procedure occurs in NR, a size of Medium Access Control (MAC) Protocol Data Unit (PDU) allowed in an uplink grant allocated during a Random Access (RA) procedure, which is transmitted from a network device (for example, gNB), may be different from a size of MAC PDU obtained from the Msg3 Buffer of an UE.

SUMMARY

In general, example embodiments of the present disclosure provide methods, devices and computer readable storage media for random access procedure.

In a first aspect, there is provided method implemented at a terminal device. The method comprises transmitting, at a terminal device, a random access request in a random access procedure to a network device; in response to receiving, in the random access procedure, from the network device an uplink grant for the terminal device, determining whether a first size of a first data unit indicated by the uplink grant matches a second size of a second data unit stored in a buffer of the terminal device; in response to determining that the first size mismatches the second size, determining a first part of the second data unit for subsequent transmissions.

In a second aspect, there is provided method implemented at a network device. The method comprises receiving, from a terminal device, a random access request in a random access procedure; in response to receiving the random access request, transmitting, to the terminal device, an uplink grant of the terminal device, the uplink grant indicating a first size of a first data unit, so that the terminal device determines whether the first size of the first data matches a second size of a second data unit stored in a buffer of the terminal device.

In an third aspect, there is provided a terminal device. The device comprises at least one processor; and at least one memory including computer program codes. The at least one memory and the computer program codes are configured to, with the at least one processor, cause the device at least to perform the method according to the first aspect.

In a fourth aspect, there is provided a network device. The device comprises at least one processor; and at least one memory including computer program codes. The at least one memory and the computer program codes are configured to, with the at least one processor, cause the device at least to perform the method according to the second aspect.

In an fifth aspect, there is provided an apparatus comprising means to perform the steps of the method according to the first aspect.

In a sixth aspect, there is provided an apparatus comprising means to perform the steps of the method according to the second aspect.

In a seventh aspect, there is provided a computer readable medium having a computer program stored thereon which, when executed by at least one processor of a device, causes the device to carry out the method according to the first aspect.

In an eighth aspect, there is provided a computer readable medium having a computer program stored thereon which, when executed by at least one processor of a device, causes the device to carry out the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, Multiple-Input Multiple-Output (MIMO), OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, in some embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. For the purpose of discussion, in some embodiments, the eNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Figure 1:
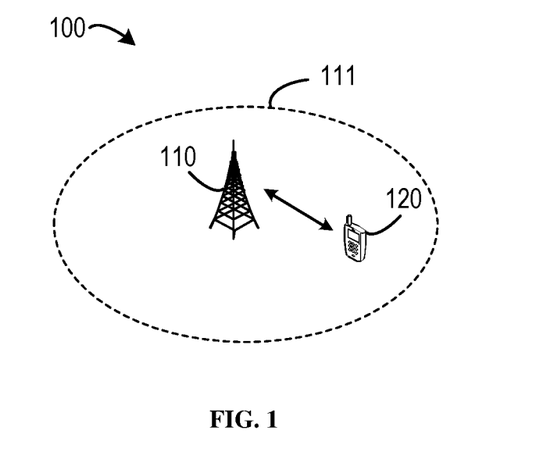
FIG. 1 shows an example communication system 100 in which example embodiments of the present disclosure can be implemented.

FIG. 1 illustrates a communication network 100 in which embodiments of the present disclosure can be implemented. The communication network 100 may comply with any suitable protocol or standard that already exists or will be developed in the future. In some embodiments, the communication network 100 may be the LTE (or LTE-A) network, the NR network or combination thereof.

The communication network 100 comprises a network device 110. The network device 110 serves a terminal device 120 in a cell 111. It is to be understood that the numbers of network devices and terminal devices are shown only for the purpose of illustration without suggesting any limitation. The communication network 100 may include any suitable numbers of network devices and terminal devices. The communication between the network device 110 and the terminal device 120 may utilize any suitable technology that already exists or will be developed in the future.

The issue of different sizes of grants provided by the communication network for MESSAGE 3 (Msg3) transmission was discussed in LTE. The Msg3 may convey Layer 2 and Layer 3 messages, such as a radio resource control connection request for initial access or C-RNTI Medium Access Control (MAC) Control Element (CE) for random access in connected mode, from the terminal device 120 to the network device 110. If an uplink grant provided in the Random Access Response (RAR) for a same group of Random Access Preambles (RAP) has a different size than a previous uplink grant (for example, the first uplink grant) allocated during that Random Access procedure, the behaviour of the terminal device 120 was not defined within a Random Access procedure as this is considered as a very rare case. In LTE, the communication network allocates CFRA resources in the whole cell for the terminal device 120. In other words, there is no switching between CFRA and CBRA within one Random Access procedure.

The 5G New Radio (NR) is provided with a multi-beam operation. Thus, unlike in LTE where CFRA resources could be allocated for one cell (for example, the cell 111 as shown in FIG. 1), in NR, the communication network may not allocate CFRA resources to all the beams but only to a subset of the beams in the cell 111, because it may be too expensive to allocate CFRA resources to all the beams for all the UEs and the purpose of beam forming may be defeated thereby.

Thus, in the case of the multi-beam operation in NR, user equipments (UEs), for example, the terminal device 120 as shown in FIG. 1, may move within a cell and change the beam. The terminal device 120 may switch between beams with one type of RA resources to some other beams with another type of RA resources, for example, the terminal device may switch between the beams allocated with Contention Free Random Access (CFRA) resources and the beams allocated with Contention Based Random Access (CBRA) resources in the cell 111.

If the terminal device 120 switches from CFRA to CBRA, there is no problem caused by the Msg3 that may only be generated during the first CBRA attempt. In the case of CFRA, the RA procedure is already successful by receiving the Msg2 from the gNB (for example, the network device 110 as shown in FIG. 1).

However, if the terminal device 120 switches from CBRA to CFRA, according to the TS 38.321, the Msg3 has been generated and shall also be transmitted with CFRA, because the Hybrid automatic repeat request (hybrid ARQ or HARQ) buffer shall be flushed upon completion of the RA procedure, but the Msg3 buffer shall not be flushed. Furthermore, in the HARQ entity, in case the uplink grant is received in a RAR and there is a Medium Access Control (MAC) Protocol Data Unit (PDU) in the Msg3 buffer, the MAC PDU may be obtained from the Msg3 buffer.

In the above case, if the grant provided in RAR to the CFRA preamble transmission having a size equal to the size indicated in the grant provided earlier in response to CBRA preamble transmission, the MAC PDU in Msg3 buffer could be transmitted in the provided grant. However, two different preamble groups, i.e. preamble Group-A and Group-B, are defined for CBRA. In general, the terminal device 120 selects the sequence from these two groups based on size of uplink packet and radio conditions. This helps the network device 110 to calculate Physical Uplink Shared Channel (PUSCH) resources needed for the uplink transfer of the terminal device 120. Preambles in Group-A are used for smaller size packets or larger size packets in poor radio conditions. Preambles in Group-B are used for larger size packets in good radio conditions. In this case, the network device 110 would not know if the terminal device 120 has been attempted CBRA before CFRA or which group of the preamble has been applied when CBRA preamble was transmitted. Hence, it will be expected that the issue caused by different Msg3 grant sizes will occur in NR frequently.

Furthermore, given the fact that the MAC PDU in the Msg3 buffer could multiplex, e.g., at least a segment of the handover (HO) complete command (RRCReconfiguration-Complete), it is not desirable to lose such data and delay the completion of the HO procedure (as RLC level re-transmission would be required). In a case that the CFRA is selected for a preamble attempt, the terminal device 120 will use Msg3 buffer for transmission of first uplink data in the RA procedure. In a case that the CFRA is selected for a preamble attempt, the RA procedure is successfully completed by RAR reception.

Thus, regarding to the fact that a size of MAC PDU indicated in an uplink grant allocated during a RA procedure, which is transmitted from a network device 110, may be different from a size of MAC PDU obtained from the Msg3 Buffer of the terminal device 120, some approaches have been considered to solve this issue.

One approach proposed that during the resource selection of random access for handover, the terminal device 120 shall not select random access preamble among the CFRA Preamble, if Msg3 has been transmitted in the current random access procedure. However, this approach may waste the dedicated resources for CFRA and increase the load unnecessarily among the contention-based preambles.

A further approach proposed that the Multiplexing and assembly entity may include a plurality of MAC sub-PDUs from the obtained MAC PDU in the subsequent uplink transmissions. In a case that the size of the uplink grant does not match the earlier uplink grant provided in response to CBRA preamble, the Msg3 buffer may be flushed and a new MAC PDU may be obtained from the Multiplexing and assembly entity. However, this approach may lead to lose of data.

As an option for flushing Msg3, MAC may indicate the data which was multiplexed in the MAC PDU and in which case the RLC PDU could be regenerated and multiplexed again. This approach may be good for handling data but may not work for MAC Control Elements (CEs).

Principle and implementations of the present disclosure will be described in detail below with reference to FIG. 2, which shows process 200 according to example embodiments of the present disclosure. For the purpose of discussion, the process 200 will be described with reference to FIG. 1. The process 200 may involve a random access procedure.

Figure 2:
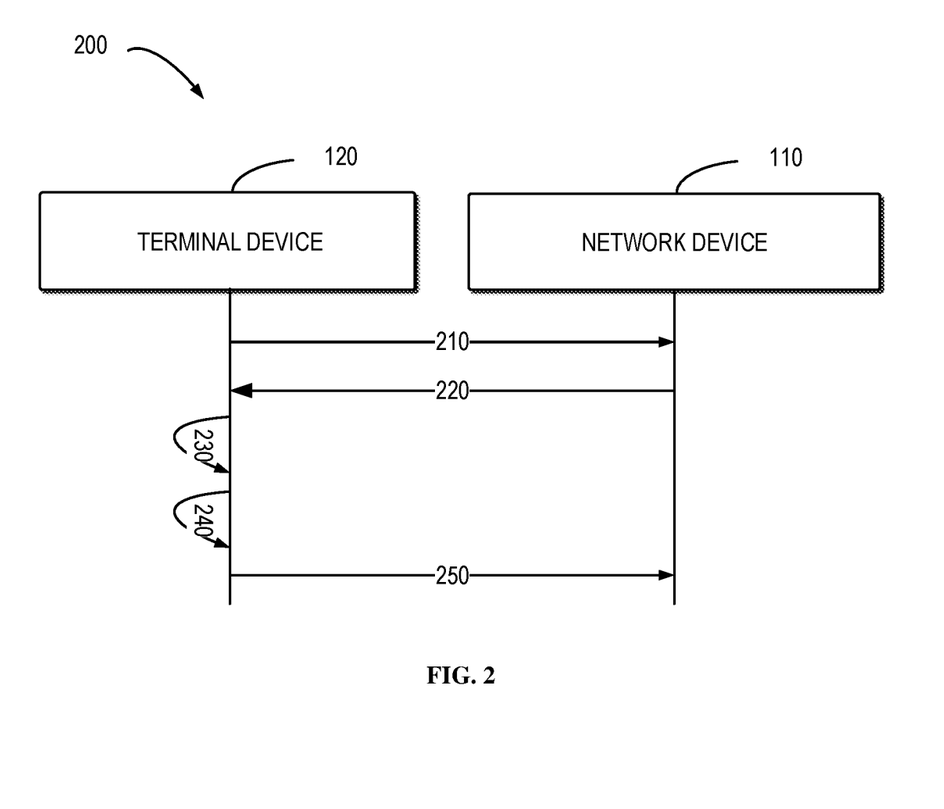
FIG. 2 shows a diagram of an example process 200 for a random access procedure according to some example embodiments of the present disclosure.

FIG. 2 shows a diagram of an example process 200 for a random access procedure in accordance with some example embodiments of the present disclosure.

As shown in FIG. 2, when the terminal device 120 performs random access, the terminal device 120 sends 210 a random access request, that is, a random access preamble (RAP) to the network device 110. The RAP is also referred as "MESSAGE 1" or "Msg1" in the context of the present disclosure. The RAP is a signature code sequence which acts as an identifier for the terminal device 120. Depending on whether the RAP is UE-specific, the random access procedure breaks down into a contention-free random access (CFRA) procedure and a contention-based random access (CBRA) procedure. Consequently, the terminal device 120 may send different random access preamble to the network device 110, namely a CFRA preamble or a CBRA preamble. As described above, for the CBRA procedure, the terminal device 120 may select the CBRA preamble from Group-A and Group-B. The terminal device 120 may select the sequence from these two groups based on size of uplink packet and radio conditions.

Upon detection of the RAP preamble from the terminal device 120, the network device 110 may respond 220 to the random access request by transmitting a random access response (RAR) (also referred as "MESSAGE 2" or "Msg2" in the context of the present disclosure) to the terminal device 120 based on the received RAP preamble. The RAR may be scheduled via a physical downlink control channel (PDCCH) and the actual message on a physical downlink shared channel (PDSCH). The RAR may include, for instance, Timing Advance Command (TAC) for UL timing alignment, uplink grant, and Temporary Cell Radio Network Identifier for the terminal device 120.

In the contention-free random access procedure, i.e., in a non-contention based random access procedure, the terminal device 120 sends a dedicated RAP to the network device 110; and, if the terminal device 120 receives a RAR sent by the network device 110, the terminal device 120 determines success of the random access procedure.

In the contention-based random access procedure, after the terminal device 120 receives the RAR, the terminal device 120 may transmit a message (also referred to as "MESSAGE 3" or "Msg3") on the physical uplink shared channel (PUSCH) to the network device 110. As mentioned above, the Msg3 may convey Layer 2 and Layer 3 messages, such as a radio resource control connection request for initial access or C-RNTI MAC CE for random access in connected mode, from the terminal device 120 to the network device 110. If the terminal device 120 receives the RAR from the network device 110, the terminal device may obtain the uplink grant contained in the RAR indicating an available uplink grant to the terminal device 120 for transmitting its Msg3.

As mention above, the terminal device 120 may send the preamble from different groups based on size of uplink packet and radio conditions and the network device 110 may allocate a corresponding uplink grant to the terminal device 120 for transmitting the Msg3. In this case, for transmitting the Msg3, the uplink grant contained in the RAR may match the uplink grant in the Msg3 buffer of the terminal device 120.

As shown in FIG. 2, the terminal device 120 determines 230 whether a first size of a first data unit indicated by the uplink grant matches a second size of a second data unit stored in the buffer of the terminal device 120. The first and the second data unit may refer to as the MAC PDU. The buffer may refer to as the Msg3 buffer of the terminal device 120.

In some example embodiments, for determining whether the first size matches the second size, the terminal device 120 may determine the second size based on the Msg3 that has been transmitted from the Msg3 buffer of the terminal device 120. The terminal device may further determine the first size from the uplink grant transmitted from the network device 110. The terminal device 120 may compare the first size with the second size and determine whether the first size mismatches the second size.

In some example embodiments, the Msg3 may indicate at least one Medium Access Control Control Element (MAC CE). In some example embodiments, the MAC CE may comprise at least one of a C-RNTI MAC CE, a Buffer Status Report, BSR and a Power Headroom Report, PHR.

In general, BSR is a kind of MAC CE from UE (for example, the terminal device 120) to gNB (for example, the network device 110) carrying the information on how much data is in the buffer of UE to be sent out.

The BSR may refer to different types of BSR. For example, the BSR may comprise Regular BSR, Periodic BSR and Padding BSR. A regular BSR is sent when a new data arrives in the buffer and the new data has higher priority than the one already waiting in the buffer. A periodic BSR is sent with the predefined periodicity. The gNB may pre-configure the periodicity to the UE by RRC message (for example, RRCConnectionReconfiguration). Furthermore, a padding BSR is sent when the number of padding bits in a data message is larger than the size of padding BSR, so that the padding bit space can be used to send the BSR. Padding BSR may comprise of a truncated BSR in case the full BSR does not fit to the available padding bits. In this case, the BSR is truncated and only the data with highest priority is reported to the network device 110 by the terminal device 120.

In general, PHR may indicate how much transmission power is left in the UE.

As shown in FIG. 2, if the terminal device 120 determines that the first size mismatches the second size, the terminal device 120 determines 240 a first part of the second data unit for subsequent transmissions.

In some example embodiments, the subsequent transmissions may comprise at least one of the following: a transmission associated with the uplink grant provided in a Random Access Response (RAR) and a transmission associated with a further uplink grant which is different from the uplink grant.

In some example embodiments, the terminal device 120 may determine whether the second size matches the first size. If the terminal device determines the second size mismatches the first size, the terminal device 120 may discard some parts from the second data unit or may not consider them for subsequent transmissions.

In some example embodiments, the terminal device 120 may discard the truncated BSR from the second data unit.

Alternatively or additionally, the terminal device 120 may discard a padding BSR from the second data unit.

Alternatively or additionally, the terminal device 120 may discard a PHR from the second data unit.

Alternatively or additionally, the terminal device 120 may adjust a size of the truncated BSR. For example, the truncated BSR is adjusted to fit the available size, i.e. the number of Logical Channel Group (LCG) reported is changed. Naturally, the bitmap may reflect the addition/removal of reported LCG). Adjusting the size of the truncated BSR could be limited to cases where the size shrinks. It should be understood that removing information might be easier for the UE implementation than creating an additional one. In this way, the newest BSR information could be provided.

Alternatively or additionally, the terminal device 120 may discard a regular/periodic BSR and/or a PHR. Additionally, the regular/periodic BSR and/or the PHR may not be cancelled until the regular/periodic BSR and PHR have been included in a grant scheduled by C-RNTI or CS-RNTI. This approach intends to provide the newest available information about the buffer status and power headroom of the terminal device 120, because the BSR/PHR would be newly generated for the subsequent transmissions.

In some example embodiments, if the terminal device determines the second size mismatches the first size, the terminal device 120 may determine whether the random access procedure is successfully completed by receiving the uplink grant. If the terminal device 120 determines that the random access procedure is considered successfully completed, the terminal device may discard a C-RNTI Medium Access Control MAC Control Element MAC CE from the second data unit.

In some example embodiments, if the terminal device 120 determines the second size mismatches the first size, the terminal device 120 may determine whether the contention free random access preamble was transmitted. If the terminal device 120 determines that the contention free random access preamble was transmitted, the terminal device may discard a C-RNTI Medium Access Control MAC Control Element MAC CE from the second data unit.

In some example embodiments, the terminal device 120 determines whether the random access procedure is successfully completed may comprises determining that the uplink grant and/or the RAR is addressed to at least one of the following: Cell Radio Network Temporary Identifier C-RNTI and a Random Access Radio Network Temporary Identifier RA-RNTI.

The case described here may relate to a random access procedure during a switching of the terminal device 120 from CBRA procedure to CFRA procedure, because in the CFRA procedure, the terminal device 120 sends a dedicated RAP to the network device 110; and, if the terminal device 120 receives a RAR sent by the network device 110, the terminal device 120 determines success of the random access. That is, it is not necessary to transmit the C-RNTI MAC CE to the network device 110.

According to this solution, since the terminal device 120 has been identified already from the transmitted CFRA preamble, the unnecessary overhead for transmission could be avoided. Furthermore, this solution avoids any other types of MAC PDU to be transmitted by the terminal device 120, since the network device 110 does not expect to receive the C-RNTI MAC CE in response to CFRA preamble transmission.

In some example embodiments, other MAC CE multiplexed in the obtained MAC PDU may be indicated to the Multiplexing and assembly entity, to be included to the subsequent uplink transmissions. In this way, the loss of control information may be avoided during the Msg3 rebuilding, because other MAC CE to be multiplexed could be included in the subsequent transmissions.

As shown in FIG. 2, the terminal device 120 transmits 250 at least portion of the first part of second data unit in the first data unit to the network device. The remaining part of the first part may be transmitted in subsequent transmissions.

Through the above embodiments, for each uplink grant, the HARQ entity of the terminal device 120 shall identify the HARQ process associated with this grant. For each identified HARQ process:

if the received grant was not addressed to a Temporary C-RNTI on PDCCH, and the New Data Indicator (NDI) provided in the associated HARQ information has been toggled compared to the value in the previous transmission of this Transfer Block (TB) of this HARQ process; or if the uplink grant was received on PDCCH for the C-RNTI and the HARQ buffer of the identified process is empty; or if the uplink grant was received in a Random Access Response; or if the uplink grant is part of a bundle of the configured grant, and may be used for initial transmission according to subclause 6.1.2.3 of TS 38.214 [7], and if no MAC PDU has been obtained for this bundle:

if there is a MAC PDU in the Msg3 buffer and the uplink grant was received in a Random Access Response:

if the uplink grant size does not match to the size of the MAC PDU in the Msg3 buffer:

indicate to Multiplexing and assembly entity to include MAC subPDUs except MAC subPDU containing Truncated BSR MAC CE from the MAC PDU in the Msg3 buffer in the subsequent uplink transmission(s), if any;

obtain the MAC PDU to transmit from the Multiplexing and assembly entity and store it in the Msg3 buffer;

if the uplink grant size is equal to the size of the MAC PDU in the Msg3 buffer:

obtain the MAC PDU to transmit from the Msg3 buffer.

if there is no MAC PDU in the Msg3 buffer and the uplink grant was received in a Random Access Response:

obtain the MAC PDU to transmit from the Multiplexing and assembly entity, if any.

Alternatively or additionally, through the above embodiments, for each uplink grant, the HARQ entity of the terminal device 120 shall identify the HARQ process associated with this grant. For each identified HARQ process:

if the received grant was not addressed to a Temporary C-RNTI on PDCCH, and the New Data Indicator (NDI) provided in the associated HARQ information has been toggled compared to the value in the previous transmission of this Transfer Block (TB) of this HARQ process; or if the uplink grant was received on PDCCH for the C-RNTI and the HARQ buffer of the identified process is empty; or if the uplink grant was received in a Random Access Response; or if the uplink grant is part of a bundle of the configured grant, and may be used for initial transmission according to subclause 6.1.2.3 of TS 38.214 [7], and if no MAC PDU has been obtained for this bundle:

if there is a MAC PDU in the Msg3 buffer and the uplink grant was received in a Random Access Response scheduled by PDCCH addressed to RA-RNTI or C-RNTI:

if the uplink grant size does not match to the size of the MAC PDU in the Msg3 buffer, and         if by this Random Access Response, the Random Access procedure is successfully completed:

indicate to Multiplexing and assembly entity to include MAC subPDUs except MAC subPDU containing Truncated BSR MAC CE or C-RNTI MAC CE from the MAC PDU in the Msg3 buffer in the subsequent uplink transmission(s), if any;

obtain the MAC PDU to transmit from the Multiplexing and assembly entity and store it in the Msg3 buffer;

if the uplink grant size is equal to the size of the MAC PDU in the Msg3 buffer:

obtain the MAC PDU to transmit from the Msg3 buffer.

if there is no MAC PDU in the Msg3 buffer and the uplink grant was received in a Random Access Response:

obtain the MAC PDU to transmit from the Multiplexing and assembly entity, if any.

In this way, the issue cause by the mismatching of the uplink grant indicated in RAR with the MAC PDU in the Msg3 buffer could be solved by means of rebuilding the MAC CE of MAC PDU according to the embodiments of the present invention.

More details of the example embodiments in accordance with the present disclosure will be described with reference to FIGS. 3-4.

Figure 3:
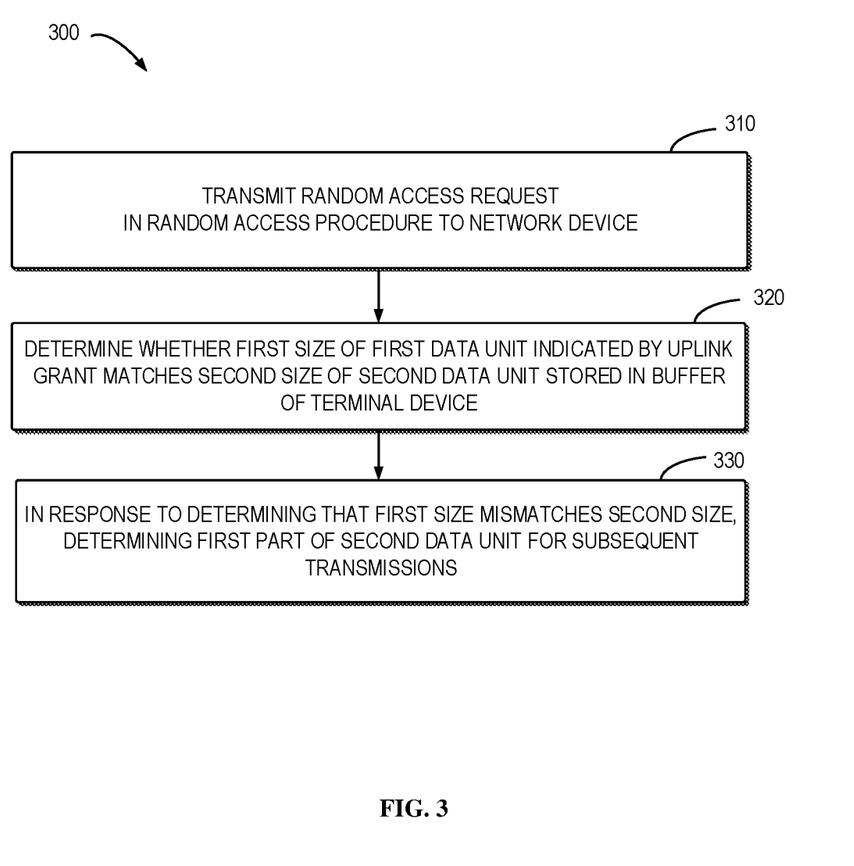
FIG. 3 shows a flowchart of an example method 300 for a random access procedure according to some example embodiments of the present disclosure.

FIG. 3 shows a flowchart of an example method 300 for random access procedure according to some example embodiments of the present disclosure. The method 300 can be implemented at the terminal device 120 as shown in FIG. 2. For the purpose of discussion, the method 300 will be described with reference to FIG. 2.

At 310, the terminal device 120 transmits a random access request in a random access procedure to a network device.

In some example embodiments, the terminal device 120 may transmit one of the following: a contention-free random access preamble and a contention-based random access preamble.

At 320, if the terminal device 120 receives, in the random access procedure, from the network device 110 an uplink grant for the terminal device 120, the terminal device 120 determines whether a first size of a first data unit indicated by the uplink grant matches a second size of a second data unit stored in a buffer of the terminal device.

In some example embodiments, the second data unit may comprise at least one of the following MAC CEs: a C-RNTI, a BSR, and a PHR.

In some example embodiments, the BSR may comprise at least one of the following: a truncated BSR, a padding BSR, a regular BSR; and a periodic BSR.

At 330, if the terminal device 120 determines that the first size mismatches the second size, if the terminal device 120 determines a first part of the second data unit for subsequent transmissions at least based on the first size.

In some example embodiments, the terminal device 120 may determine whether the second size matches the first size. If the second size mismatches the first size, the terminal device may performing at least one of the following: discarding a truncated Buffer Status Report BSR from the second data unit; discarding a padding Buffer Status Report BSR from the second data unit; discarding a regular BSR from the second data unit; discarding a periodic BSR from the second data unit; and discarding a Power Headroom Report PHR from the second data unit; and adjusting a size of the truncated BSR.

In some example embodiments, the terminal device 120 may determine whether the second size matches the first size. If the second size mismatches the first size, the terminal device 120 may determine whether the random access procedure is successfully completed by receiving the uplink grant. If the terminal device 120 determines that the random access procedure is considered successfully completed, the terminal device 120 may discard a C-RNTI Medium Access Control MAC Control Element MAC CE from the second data unit.

In some example embodiments, if the terminal device 120 may determine whether the second size mismatches the first size. If the second size mismatches the first size, the terminal device 120 may determine whether the contention free random access preamble was transmitted. If the terminal device 120 determines that the contention free random access preamble was transmitted, the terminal device may discard a C-RNTI Medium Access Control MAC Control Element MAC CE from the second data unit.

In some example embodiments, the terminal device 120 determines whether the random access procedure is successfully completed may comprises determining that the uplink grant is addressed to at least one of the following: Cell Radio Network Temporary Identifier C-RNTI and a Random Access Radio Network Temporary Identifier RA-RNTI.

In some example embodiments, the subsequent transmissions may comprise at least one of the following: a transmission associated with the uplink grant and a transmission associated with a further uplink grant which is different from the uplink grant.

In some example embodiments, the terminal device 120 may further transmits at least portion of the first part of second data unit in the first data unit to the network device.

Figure 4:
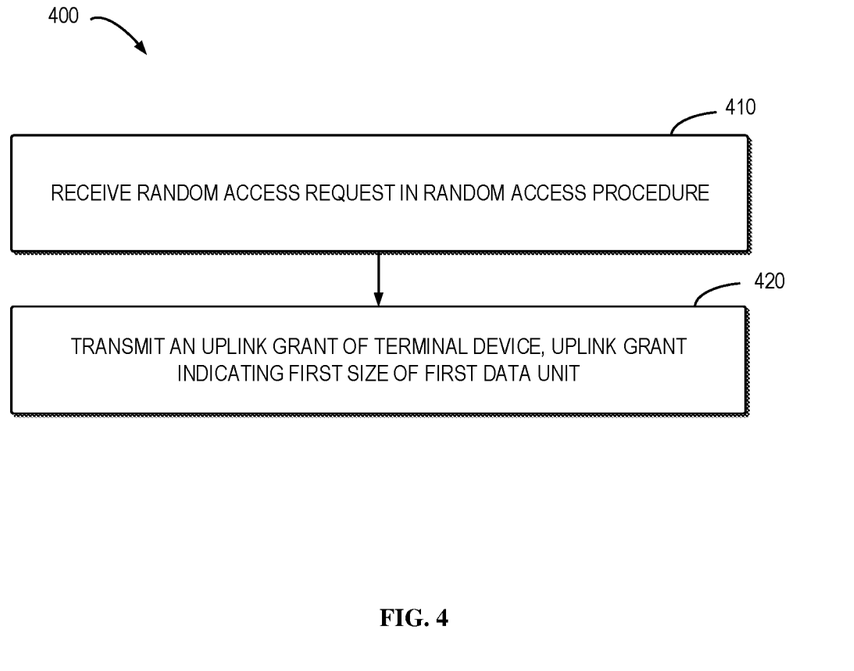
FIG. 4 shows a flowchart of an example method 400 for a random access procedure according to some example embodiments of the present disclosure.

FIG. 4 shows a flowchart of an example method 400 for random access procedure according to some example embodiments of the present disclosure. The method 300 can be implemented at the network device 110 as shown in FIG. 2. For the purpose of discussion, the method 400 will be described with reference to FIG. 2.

At 410, the network device 110 receives, from a terminal device 120, a random access request in a random access procedure.

In some example embodiments, the network device 110 may receive one of the following: a contention-free random access preamble; and a contention-based random access preamble.

At 420, the network device 110 transmits, to the terminal device 120, an uplink grant of the terminal device, the uplink grant indicating a first size of a first data unit, so that the terminal device determines whether the first size of the first data matches a second size of a second data unit stored in a buffer of the terminal device.

In some example embodiments, the second data unit may comprise at least one of the following MAC CEs: a C-RNTI, a BSR, and a PHR.

In some example embodiments, the BSR may comprise at least one of the following: a truncated BSR and a padding BHR, a regular BSR; and a periodic BSR.

In some example embodiments, the network device 110 may further receive from the terminal device, at least portion of the first part of second data unit in the first data unit.

In some example embodiments, an apparatus capable of performing the method 300 (for example, the terminal device 120) may comprise means for performing the respective steps of the method 300. The means may be implemented in any suitable form. For example, the means may be implemented in a circuitry or software module.

In some example embodiments, the apparatus comprises: means for transmitting, at a terminal device, a random access request in a random access procedure to a network device; means for in response to receiving, in the random access procedure, from the network device an uplink grant for the terminal device, determining whether a first size of a first data unit indicated by the uplink grant matches a second size of a second data unit stored in a buffer of the terminal device; means for in response to determining that the first size mismatches the second size, determining a first part of the second data unit for subsequent transmissions.

In some example embodiments, the means for transmitting the random access request may comprise means for transmitting one of the following: a contention-free random access preamble; and a contention-based random access preamble.

In some example embodiments, the second data unit may comprise at least one of the following MAC CEs: a C-RNTI, a BSR, and a PHR.

In some example embodiments, the BSR may comprise at least one of the following: a truncated BSR and a padding BHR, a regular BSR; and a periodic BSR.

In some example embodiments, the means for determining the first part comprises may comprise means for in response to determining that the second size mismatches the first size, preforming at least one of the following: discarding a truncated Buffer Status Report BSR from the second data unit; discarding a padding Buffer Status Report BSR from the second data unit; discarding a regular BSR from the second data unit; discarding a periodic BSR from the second data unit; and discarding a Power Headroom Report PHR from the second data unit; and adjusting a size of the truncated BSR.

In some example embodiments, the means for determining the first part comprises may comprise means for in response to determining that the second size mismatches the first size, determining whether determining whether the random access procedure is successfully completed by receiving the uplink grant and means for in response to determining that the random access procedure is considered successfully completed, discarding a C-RNTI Medium Access Control MAC Control Element MAC CE from the second data unit.

In some example embodiments, the means for determining whether the random access procedure is successfully completed may comprise means for determining that the uplink grant is addressed to at least one of the following: a Cell Radio Network Temporary Identifier C-RNTI and a Random Access Radio Network Temporary Identifier RA-RNTI.

In some example embodiments, the subsequent transmissions may comprise at least one of the following: a transmission associated with the uplink grant and a transmission associated with a further uplink grant which is different from the uplink grant.

In some example embodiments, the apparatus may further comprise means for transmitting at least portion of the first part of second data unit in the first data unit to the network device.

In some example embodiments, an apparatus capable of performing the method 400 (for example, the network device 110) may comprise means for performing the respective steps of the method 400. The means may be implemented in any suitable form. For example, the means may be implemented in a circuitry or software module.

In some example embodiments, the apparatus comprises: means for receiving, from a terminal device, a random access request in a random access procedure; means for in response to receiving the random access request, transmitting, to the terminal device, an uplink grant of the terminal device, the uplink grant indicating a first size of a first data unit, so that the terminal device determines whether the first size of the first data unit matches a second size of a second data unit stored in a buffer of the terminal device.

In some example embodiments, the means for receiving the random access request may comprise means for receiving one of the following: a contention-free random access preamble; and a contention-based random access preamble.

In some example embodiments, the second data unit may comprise at least one of the following MAC CEs: a C-RNTI, a BSR, and a PHR.

In some example embodiments, the BSR may comprise at least one of the following: a truncated BSR and a padding BHR, a regular BSR; and a periodic BSR.

In some example embodiments, the apparatus further comprises: means for receiving, from the terminal device, at least portion of the first part of second data unit in the first data unit.

Figure 5:
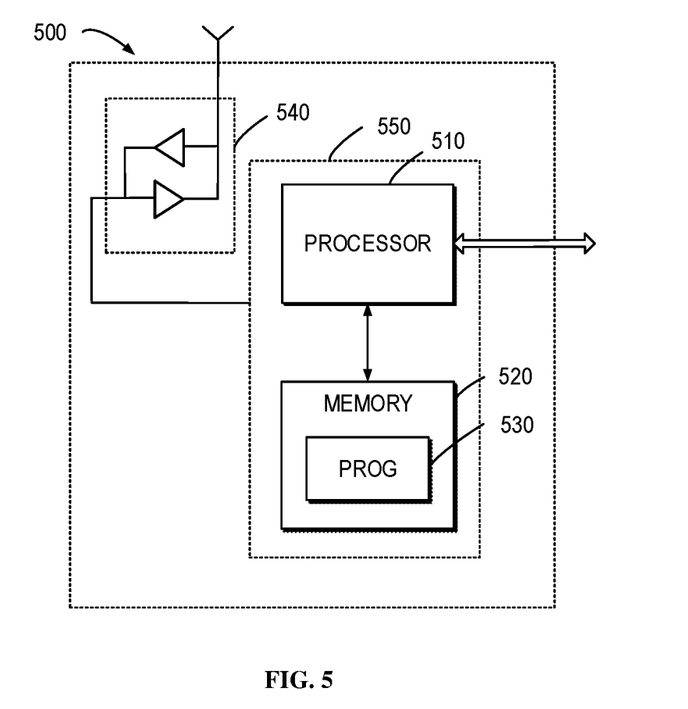
FIG. 5 is a simplified block diagram of a device that is suitable for implementing example embodiments of the present disclosure.

FIG. 5 is a simplified block diagram of a device 500 that is suitable for implementing example embodiments of the present disclosure. The device 500 can be considered as a further example implementation of a terminal device 120 as shown in FIG. 1. Accordingly, the device 500 can be implemented at or as at least a part of the terminal device 110.

As shown, the device 500 includes a processor 510, a memory 520 coupled to the processor 510, a suitable transmitter (TX) and receiver (RX) 540 coupled to the processor 510, and a communication interface coupled to the TX/RX 540. The memory 510 stores at least a part of a program 530. The TX/RX 540 is for bidirectional communications. The TX/RX 540 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 530 is assumed to include program instructions that, when executed by the associated processor 510, enable the device 500 to operate in accordance with the example embodiments of the present disclosure, as discussed herein with reference to FIGS. 2 to 4. The example embodiments herein may be implemented by computer software executable by the processor 510 of the device 500, or by hardware, or by a combination of software and hardware. The processor 510 may be configured to implement various example embodiments of the present disclosure. Furthermore, a combination of the processor 510 and memory 510 may form processing means 550 adapted to implement various example embodiments of the present disclosure.

The memory 510 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 510 is shown in the device 500, there may be several physically distinct memory modules in the device 500. The processor 510 may be of any type suitable to the local technical network, and may include one or more of general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 to 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method, comprising:
   transmitting, at a terminal device, a random access request in a random access procedure to a network device;
   receiving, during the random access procedure, from the network device an uplink grant for the terminal device,
   determining whether a size indicated by the uplink grant matches a size of a medium access control (MAC) protocol data unit (PDU) stored in a buffer of the terminal device;
   after determining that the size indicated by the uplink grant mismatches the size of the medium access control protocol data unit stored in the buffer, including a medium access control sub protocol data unit in a subsequent uplink transmission,
   wherein including the medium access control sub-protocol data unit from the medium access control protocol data unit in the subsequent uplink transmission comprises:
     determining whether the random access procedure is successfully completed by receiving the uplink grant; and
     in response to determining that the random access procedure is considered successfully completed, discarding or not taking into consideration a cell radio network temporary identifier (C-RNTI) medium access control (MAC) control element (CE) from the medium access control protocol data unit in the subsequent uplink transmission,
       wherein the determining whether the random access procedure is successfully completed comprises determining that the uplink grant is addressed to a cell radio network temporary identifier.

2. The method of claim 1, wherein transmitting the random access request comprises transmitting one of the following:
   a contention-free random access preamble; and
   a contention-based random access preamble.

3. The method of claim 1, wherein the medium access control protocol data unit comprises at least one of the following Mmedium Aaccess Gcontrol (MAC) control elements:
   a Cell Radio Network Temporary Identifier C-RNTI;
   a Buffer Status Report BSR; and
   a Power Headroom Report PHR.

4. The method of claim 3, wherein the BSR comprises at least one of the following:
   a truncated B SR;
   a padding BSR;
   a regular BSR; and
   a periodic BSR.

5. The method of claim 1, wherein including the medium access control sub-protocol data unit in the subsequent uplink transmission comprises at least one of:
   discarding a truncated buffer status report (BSR) from the medium access control protocol data unit;
   discarding a padding BSR from the medium access control protocol data unit;
   discarding a regular BSR from the medium access control protocol data unit;
   discarding a periodic BSR from the medium access control protocol data unit;
   discarding a power headroom report (PHR) from the medium access control protocol data unit; and
   adjusting a size of the truncated BSR.

6. The method of claim 1, wherein the subsequent uplink transmission comprises at least one of the following:
  a transmission associated with the uplink grant; and
  a transmission associated with a further uplink grant, the further uplink grant being different with the uplink grant.

7. The method of claim 1, further comprising:
  transmitting, to the network device, at least a portion of the medium access control sub-protocol data units of the medium access control protocol data unit.

8. The method of claim 1,
  wherein the medium access control protocol data unit stored in the buffer has been generated during a contention-based random access (CBRA) attempt, and
  wherein the random access procedure comprises a switching from the contention-based random access attempt to a contention-free random access (CFRA) procedure, and
  wherein the random access request is a contention-free random access preamble for the contention-free random access procedure.

9. The method of claim 8, wherein the switching from the contention-based random access attempt to the contention-free random access procedure corresponds to a beam change in a multi-beam operation supported by a recovery mechanism.

10. A terminal device, comprising:
  at least one processor; and
  at least one memory including computer program codes;
  the at least one memory and the computer program codes are configured to, with the at least one processor, cause the terminal device at least to:
    transmit, at the terminal device, a random access request in a random access procedure to a network device;
    receive, during the random access procedure, from the network device an uplink grant for the terminal device,
    determine whether a size indicated by the uplink grant matches a size of a medium access control (MAC) protocol data unit (PDU) stored in a buffer of the terminal device;
    after determining that the size indicated by the uplink grant mismatches the size of the medium access control protocol data unit stored in the buffer, including a medium access control sub-protocol data unit of the packet data unit in a subsequent uplink transmission,
  wherein the terminal device is caused to include the medium access control sub-protocol data unit from the medium access control protocol data unit in the subsequent uplink transmission by:
    determining whether the random access procedure is successfully completed by receiving the uplink grant; and
    in response to determining that the random access procedure is considered successfully completed, discarding or not taking into consideration a cell radio network temporary identifier (C-RNTI) medium access control (MAC) control element (CE) from the medium access control protocol data unit in the subsequent uplink transmission,
  wherein the determining whether the random access procedure is successfully completed comprises determining that the uplink grant is addressed to a cell radio network temporary identifier.

11. The terminal device of claim 10, wherein the terminal device is caused to transmit the random access request by transmitting one of the following:
  a contention-free random access preamble; and
  a contention-based random access preamble.

12. The terminal device of claim 10, wherein the medium access control protocol data unit comprises at least one of the following medium access control (MAC) control elements:
  a Cell Radio Network Temporary Identifier C-RNTI;
  a Buffer Status Report BSR; and
  a Power Headroom Report PHR.

13. The terminal device of claim 12, wherein the BSR comprises at least one of the following:
  a truncated BSR;
  a padding BSR;
  a regular BSR; and
  a periodic BSR.

14. The terminal device of claim 10, wherein the terminal device is caused to determine the medium access control sub-protocol data unit in the subsequent uplink transmission by at least one of:
  discarding a truncated buffer status report (BSR) from the medium access control protocol data unit;
  discarding a padding BSR from the medium access control protocol data unit;
  discarding a regular BSR from the medium access control protocol data unit;
  discarding a periodic BSR from the medium access control protocol data unit;
  discarding a power headroom report (PHR) from the medium access control protocol data unit; and
  adjusting a size of the truncated BSR.

15. The terminal device of claim 10, wherein the subsequent uplink transmission comprises at least one of the following:
  a transmission associated with the uplink grant; and
  a transmission associated with a further uplink grant, the further uplink grant being different with the uplink grant.

16. The terminal device of claim 10, wherein the terminal device is further caused to:
  transmit, to the network device, at least a portion of the medium access control sub-protocol data units of the medium access control protocol data unit.

17. The terminal device of claim 10,
  wherein the medium access control protocol data unit stored in the buffer has been generated during a contention-based random access (CBRA) attempt, and
  wherein the random access procedure comprises a switching from the contention-based random access attempt to a contention-free random access (CFRA) procedure, and
  wherein the random access request is a contention-free random access preamble for the contention-free random access procedure.

18. The terminal device of claim 17, wherein the switching from the contention-based random access attempt to the contention-free random access procedure corresponds to a beam change in a multi-beam operation supported by a recovery mechanism.

19. A non-transitory computer program product comprising a computer-readable medium bearing computer program code embodied therein for use with a computer, the computer program code comprising code for:
  transmitting, at a terminal device, a random access request in a random access procedure to a network device;

receiving, during the random access procedure, from the network device an uplink grant for the terminal device, determining whether a size indicated by the uplink grant matches a size of a medium access control (MAC) protocol data unit (PDU) stored in a buffer of the terminal device;

after determining that the size indicated by the uplink grant mismatches the size of the medium access control protocol data unit stored in the buffer, including a medium access control sub-protocol data unit in a subsequent uplink transmission, wherein including the medium access control sub-protocol data unit from the medium access control protocol data unit in the subsequent uplink transmission comprises:

determining whether the random access procedure is successfully completed by receiving the uplink grant; and   in response to determining that the random access procedure is considered successfully completed, discarding or not taking into consideration a cell radio network temporary identifier (C-RNTI) medium access control (MAC) control element (CE) from the medium access control protocol data unit in the subsequent uplink transmission,     wherein the determining whether the random access procedure is successfully completed comprises determining that the uplink grant is addressed to a cell radio network temporary identifier.

\* \* \* \* \*

UNITED STATES PATENT AND TRADEMARK OFFICE
CERTIFICATE OF CORRECTION

Page 1 of 1

PATENT NO. : 11,997,718 B2
APPLICATION NO. : 17/276591
DATED : May 28, 2024
INVENTOR(S) : Samuli Turtinen et al.

It is certified that error appears in the above-identified patent and that said Letters Patent is hereby corrected as shown below:

In the Claims

In Column 16, Line 43, Claim 3, delete "Mmedium Aaccess Gcontrol" and insert -- medium access control --, therefor.

In Column 16, Line 50, Claim 4, delete "B SR;" and insert -- BSR; --, therefor.

Signed and Sealed this
Seventeenth Day of December, 2024

Derrick Brent
*Acting Director of the United States Patent and Trademark Office*